(12) United States Patent
Mordkovich et al.

(10) Patent No.: US 9,446,396 B2
(45) Date of Patent: Sep. 20, 2016

(54) SUPPORT FOR CATALYST OF EXOTHERMIC PROCESSES AND CATALYST PREPARED THEREON

(75) Inventors: Vladimir Zalmanovich Mordkovich, Moscow (RU); Lilia Vadimovna Sineva, Moscow (RU); Igor Grigorievich Solomonik, Moscow (RU); Vadim Sergeevich Ermolaev, Moscow (RU); Eduard Borisovich Mitberg, Ekaterinburg (RU)

(73) Assignee: INFRA XTL TECHNOLOGY LIMITED, Limassol (CY)

( * ) Notice: Subject to any disclaimer, the term of this patent is extended or adjusted under 35 U.S.C. 154(b) by 693 days.

(21) Appl. No.: 13/387,225

(22) PCT Filed: Aug. 3, 2010

(86) PCT No.: PCT/RU2010/000429
§ 371 (c)(1),
(2), (4) Date: Jan. 26, 2012

(87) PCT Pub. No.: WO2011/016759
PCT Pub. Date: Feb. 10, 2011

(65) Prior Publication Data
US 2012/0122674 A1    May 17, 2012

(30) Foreign Application Priority Data
Aug. 4, 2009 (RU) .............................. 2009129645

(51) Int. Cl.
| | | |
|---|---|---|
| B01J 21/02 | (2006.01) |
| B01J 37/00 | (2006.01) |
| B01D 53/94 | (2006.01) |
| B01J 23/40 | (2006.01) |
| B01J 23/44 | (2006.01) |
| B01J 23/63 | (2006.01) |
| B01J 23/652 | (2006.01) |
| B01J 23/70 | (2006.01) |
| B01J 23/75 | (2006.01) |
| B01J 23/755 | (2006.01) |
| B01J 23/78 | (2006.01) |
| B01J 23/80 | (2006.01) |
| B01J 23/86 | (2006.01) |
| B01J 23/889 | (2006.01) |
| B01J 23/89 | (2006.01) |
| B01J 29/24 | (2006.01) |
| B01J 37/02 | (2006.01) |
| C10G 2/00 | (2006.01) |

(52) U.S. Cl.
CPC .......... *B01J 37/0009* (2013.01); *B01D 53/945* (2013.01); *B01J 21/02* (2013.01); *B01J 23/40* (2013.01); *B01J 23/44* (2013.01); *B01J 23/63* (2013.01); *B01J 23/6522* (2013.01); *B01J 23/70* (2013.01); *B01J 23/75* (2013.01); *B01J 23/755* (2013.01); *B01J 23/78* (2013.01); *B01J 23/80* (2013.01); *B01J 23/866* (2013.01); *B01J 23/8896* (2013.01); *B01J 23/8913* (2013.01); *B01J 23/8946* (2013.01); *B01J 29/24* (2013.01); *B01J 37/0244* (2013.01); *C10G 2/33* (2013.01); *B01D 2255/1021* (2013.01); *B01D 2255/1023* (2013.01); *B01D 2255/2092* (2013.01); *B01D 2258/012* (2013.01); *Y02T 10/22* (2013.01)

(58) Field of Classification Search
CPC .......... B01J 23/85; B01J 23/40; B01J 21/02; B01J 2531/31
USPC .......................................... 423/213.2, 213.5
See application file for complete search history.

(56) References Cited

U.S. PATENT DOCUMENTS

| 5,185,299 A * | 2/1993 | Wood ........................ C01F 7/02 501/127 |
| 5,407,887 A * | 4/1995 | Miyashita ............ B01J 37/0219 427/388.1 |
| 6,114,429 A * | 9/2000 | Yamada ................... C08L 83/04 252/512 |
| 6,518,220 B2 * | 2/2003 | Walsdorff et al. ............ 502/346 |
| 2002/0103080 A1 * | 8/2002 | Choudhary et al. .......... 502/339 |
| 2006/0165986 A1 * | 7/2006 | Potapova et al. ............. 428/402 |
| 2006/0225533 A1 | 10/2006 | Minami |
| 2011/0188213 A1 * | 8/2011 | Domae ................... C08L 83/04 361/748 |
| 2012/0122654 A1 * | 5/2012 | Kuperman et al. ................ 502/5 |
| 2012/0311985 A1 * | 12/2012 | Iwasaki ................ C01G 23/002 55/523 |

FOREIGN PATENT DOCUMENTS

RU        2 256 501 C1    7/2005
WO    WO 2008/079051 A1  7/2008

OTHER PUBLICATIONS

Hesabi, Z.R. et al. 2007 "An investigation on the compressibility of aluminum/nano-alumina composite powder prepared by blending and mechanical milling" *Materials Science and Engineering: A* vols. 454-455: 89-98.

* cited by examiner

*Primary Examiner* — Melvin C Mayes
*Assistant Examiner* — Colette Nguyen
(74) *Attorney, Agent, or Firm* — Knobbe, Martens, Olson & Bear, LLP

(57) ABSTRACT

The present invention relates to petrochemistry and gas chemistry, and discloses a support for catalysis of exothermic processes, particularly the Fischer-Tropsch process, methanol synthesis, hydrogenation and purification of exhaust gases. The support comprises metallic aluminum in the form of a mixture of dispersed powders of flaky and spherical aluminum and the support is in the form of pellets, preferably cylinders, tablets, balls, obtained by extrusion, pelletization, tabletting, rounding or liquid molding. The catalyst prepared on the support comprises an active metal selected from the group consisting of Co, Fe, Ni, Ru, Rh, Pt, Pd, Cu and mixtures thereof.

10 Claims, No Drawings

SUPPORT FOR CATALYST OF EXOTHERMIC PROCESSES AND CATALYST PREPARED THEREON

FIELD OF THE INVENTION

The present invention relates to petrochemistry, gas chemistry and discloses a support for catalyst of exothermic processes, particularly the Fischer-Tropsch process, methanol synthesis, hydrogenation, purification of exhaust gases and as well as the present invention discloses a catalyst supported thereon.

BACKGROUND OF THE INVENTION

It is well known that the heterogeneous exothermic processes can be carried out technologically in the fluidized reactors, the slurry phase reactors and in the fixed-bed reactors. The fixed-bed reactors are the most commonly encountered systems in the area of the catalytic technologies. Such reactor is a heterogeneous system that consists of at least two phases: solid particles of the catalyst and spaces in between where the reaction mixture flows in form of gas and/or liquid. Simultaneously the chemical conversions on the catalyst surface and the following physical processes take place in the reactor: the reaction component and product transfer in the bed, heat transfer and gas flow etc.

In the tubular reactor the heat transfer between the reaction mixture and cooling medium is realized through the reactor wall. The catalyst is packed into the tubes of the small diameter (2-8 cm); the cooling medium (e.g. high pressure steam) circulates in the intertubular space. The important advantage of the tubular reactors is favorable terms for heat removal from the catalyst because the ratio of the cooling surface to the catalyst volume is well over than in other apparatuses.

The formation of the optimal temperature range in the catalyst bed is one of the main problems faced by specialists during the development of the catalytic tubular reactors. The improvement of the heat and mass transfer in each catalyst pellet promotes it. It is possible to improve the heat transfer by using a support for catalyst based on the high heat conducting material and the mass transfer can be enhanced by using a support with isotropic properties.

US 20040024274 relates to a catalyst for the hydrogenation of a monocyclic or polycyclic aromatic hydrocarbons comprising at least one metal of transition group VIII of the Periodic Table and a structured or monolithic support. The structured supports have a regular two-dimensional or three-dimensional structure and they are in this way distinguished from particulate catalysts which are usually used in the fixed-bed reactor. The structured supports or monoliths can comprise metallic, inorganic, organic or synthetic materials or combinations of such materials. Examples of metallic materials are pure metals such as iron, copper, nickel, silver, aluminum and titanium or alloys such as steels, for instance nickel steel, chromium steel and molybdenum steel, brass, phosphor bronze, Monell and nickel silver. For example, the catalyst body can be made of metallic, structured supports or monoliths comprising stainless steel which preferably displays roughening of the surface when heated in air at 400-1100° C. during 1-20 hours and subsequently cooling to room temperature. Moreover the surface becomes enriched in an alloying constituent (for example, aluminum or chromium from which a corresponding surface layer of $Al_2O_3$ or $Cr_2O_3$ is formed). Roughening can also be carried out mechanically in place of or in addition to thermal roughening. Preference is given to using structured supports in the form of woven metal meshes or fabrics, knitted metal meshes or fabrics or metal felts, woven carbon fibers or carbon fiber felts or woven or knitted polymer fabrics or meshes.

Examples of inorganic materials are ceramic materials such as aluminum oxide, silicon dioxide, zirconium dioxide, cordierite and steatite. It is also possible to use carbon. Examples of synthetic support materials are, for example, polymers or glass fibers.

The catalysts may further comprise promoters, for example, alkali metals and/or alkaline earth metals (e.g. lithium, sodium, potassium, rubidium, cesium, magnesium, calcium, strontium and barium); silicon, carbon, titanium, zirconium, tungsten and the lanthanides and actinides; coinage metals such as copper, silver and/or gold, zinc, tin, bismuth, antimony, molybdenum, tungsten and/or other promoters such as sulfur and/or selenium.

The structured supports or monoliths can be coated with one, two or more oxides by sputtering before applying the active components. The active metals are applied to the support by impregnation with aqueous or organic solutions or suspensions comprising the active components.

The hydrogenation is preferably carried out at from about 50 to 200° C. and at pressures of less than 50 bar. As a result the formation of undesirable by-products such as n-paraffins is virtually nonexistent, so that the purification becomes unnecessary; this makes the process very economical. When the process is carried out continuously, the amount of the compound to be hydrogenated is preferably from about 0.05 to about 3 kg/l of catalyst per hour. Moreover the conversion of benzene and a yield of cyclohexane are 99.99%. The space-time yield was 0.928 kg/(l·h).

The disadvantage of such catalyst and the support is the following: the support nature does not allow obtaining the catalyst with high concentration of the active component in the reaction volume; it decreases the process productivity and results in increasing the reactor dimensions.

EP 1994982 relates to a catalyst for purification of exhaust gases, comprising an anodized layer (formed by subjecting the carcass-forming metal to anodizing treatment) having micropores thereon, and catalytically active metal in the micropores. The carcass-forming metal surface becomes covered by an oxide film during anodizing treatment; such metals include aluminum, tantalum, niobium, titanium, hafnium, zirconium, zinc, tungsten, bismuth and antimony, preferably aluminum, both pure aluminum and alloys. At least one element oxide (able to adsorb $NO_x$) selected from the group consisting of K, Ba, La, Ca, Li, Ce, Zr, Pr, Nd, Te, Sm and Gd in an amount of at least 0.01 $g/m^2/mm$ and at least one element selected from the group consisting of Pd, Pt, Rh, Ru, Ir, Ag and Ga in an amount of at least 0.15 $g/m^2/\mu m$ are used as catalytically active metal. The catalyst further comprises the porous material having the ability to adsorb ammonia; the material is applied on the anodized layer. The anodized layer is obtained as follows: firstly the support is subjected to treatment for the grained surface formation then anodizing treatment takes place. The porous material is applied on the anodized aluminum layer as a mixture containing a zeolite in combination with at least one of phosphoric acid and/or colloidal silica and/or boehmite sol. The amount of the porous material is defined based on the required thickness of the anodized layer and its porosity. The catalyst body surface has a micropore density of from 50 to 10000 pores/$\mu m^2$, and the micropores preferably occupy from 20 to 80% of the surface area.

Such catalyst comprises small amount of precious metal and it is effective for purification of exhaust gases of diesel engines from nitrogen oxide ($NO_x$) even at relatively low temperatures (150-250° C.).

The disadvantage of the catalyst and support is great difficulty of the method of obtaining. The method comprises the following stages:

1) heat treatment of the carcass-forming metal;
2) grained surface formation;
3) anodizing treatment;
4) acid or alkali treatment of the anodized layer;
5) hydration treatment;
6) application of oxide able to adsorb $NO_x$;
7) application of active metal;
8) application of porous material able to adsorb ammonia.

Such multistage method makes difficult the catalyst production on an industrial scale.

EP 2033709 provides a catalyst containing the support and catalytic component. The support is a metal substrate with aluminum-containing surface; the metal substrate is treated for formation rough layer on its surface. The metal substrate is a metal fiber, metal foil, metal mesh or metal plate. The rough surface of the substrate contains aluminum, the aluminum surface is scaled (flaky). The metal substrate is subjected to ultrasound or microwaves by immersing in a solution with hydrophilic alcohol or hydrocarbons, and then the substrate is calcinated at 300-500° C., during 0.5-1.0 hour. The period of the ultrasound or microwaves treatment is preferably set within a range that an amount of precipitation of iron or chromium is less than that of aluminum. The precious metals, such as platinum, palladium, and rhodium are used as catalytic component; oxides can be used as support. The support contains cerium, cerium, zirconium, alkali metals, alkaline-earth metals and oxides, for example, alumina. The catalyst can be used in the process of purification of exhaust gases. CO conversion is 83-99% and it depends on the catalyst layer thickness.

All cited catalysts have structured or monolith supports, their preparation for applying catalytic material is quite difficult. This fact limits the practical use of such catalysts.

The catalysts having powder of aluminium (consisting of particles in form of flakes or scales) or pellets containing aluminium in form of flakes as support component do not have such disadvantages. Moreover the metallic aluminium has high heat conductivity and improves the heat transfer from the reaction zone. The facts increase the stability of the catalyst function.

RU2326732 provides the catalyst for Fischer-Tropsch synthesis comprising a metal of the VIII group of the Mendeleev's Periodic Table of the Elements as active component, a support containing an oxide component and the metallic aluminium in the form of flakes. The active component content is 5-40% based on the total weight of the catalyst. The oxide component contains aluminium oxide and/or silicon oxide and/or titanium oxide and/or zirconium oxide. The content of aluminium in the form of flakes is 1-25% based on the total weight of the catalyst. Metals of the VII-VIII groups of the Mendeleev's Periodic Table of the Elements and/or oxides can be used as promoters.

The support is obtained by extrusion of a paste, followed by the heat treatment and disintegration to the fraction with desired size. The paste comprises an oxide component, metallic aluminium in the form of flakes, diethyl ether, water and a binder. 5-15% wt boehmite based on the total weight of the catalyst can be used as the binder. The active component and promoters are applied by impregnation, followed by drying, calcinating on air flow.

Before carrying out the synthesis, the catalyst is activated by reduction in the hydrogen stream (GHSV 100-5000 l/h) at a temperature in the range from 300 to 600° C. during a time period from 0.5 to 5 hours. Synthesis of hydrocarbons from $CO:H_2$ is carried out in a tubular reactor with a fixed bed of the catalyst under a pressure in the range from 0.1 to 4 MPa, and a temperature in the range from 150 to 300° C. The molar ratio of $CO:H_2$ in synthesis gas is in the range from 1:1 to 1:3. The synthesis gas can contain up to 25% nitrogen.

The catalyst gives CO conversion of 48-83%, methane selectivity of 6-12%, $C_{5+}$ selectivity of 75-90% and productivity of 85-112 $kgC_{5+}/m^3/h$.

The disadvantage of the catalyst and the support is much hampered mass transfer in the radial direction of the pellet; the reason of the facts is in obtaining of the support from the paste containing aluminium in the form of flakes, which get easily aligned during extrusion. Therefore the support has strongly marked anisotropy of the properties, i.e. has different properties in the directions perpendicular and parallel to the direction of the movement of the extruded body.

As well as use of aluminium in the form of flakes gives an increased risk because of the pyrophoricity of the flakes, hence it makes difficult the obtaining of the support and the catalyst. Moreover aluminium content is insufficient in order to provide the desired heat removal from the active centers when the synthesis gas GHSV in the catalyst bed is more than 3000 l/h. This is due to that the main part of the active component is deposited on the surface of aluminium; the fact decreases the efficiency of using the active component.

RU2256501 relates to a catalyst and support for synthesis of hydrocarbons from CO and $H_2$ based on cobalt. The catalyst comprises the powder of metallic aluminium as support. The catalyst can comprise promoter selected from the group of the metal oxides, e.g. $ZrO_2$, $La_2O_3$ or $K_2O$ or metals, e.g. Re, Ru, Pd or Pt.

The catalyst is prepared as follows: the aluminium powder (in accordance with GOST (State Standard, Russian Federation) 5494-95 powder consisting of particles of scaled or flaky form) is impregnated with an aqueous solution of cobalt nitrate. Then the impregnated powder is dried on water bath and calcined at 450° C. for 1 hour on air flow. The catalyst is activated by reduction in the hydrogen stream (GHSV 100-3000 l/h) at a temperature in the range from 400 to 600° C. during a time period from 1 to 5 hours. Synthesis of hydrocarbons from the mixture of 66-68 mol. % $H_2$ and 32-34 mol. % CO is carried out under the atmospheric pressure and a temperature in the range from 160 to 230° C. with syngas GHSV of 100 l/h.

In spite of improved diffuse mass transfer in comparison with ordinary pellets, the disadvantage of the catalyst is low activity and productivity of the synthesis because of low synthesis gas GHSV in the catalyst bed and impossibility to increase it.

As well as it is impossible to use the catalyst in the industrial fixed bed reactors because the support and the catalyst on the support are in the powdered (pulverized) form. The fact increases considerably the pressure drop in the reactor to the value that is inadmissible for the process performance.

Therefore the metallic aluminium in the known supports and the catalysts is used in the form of powder from the flakes or the morphology of the particles is not disclosed.

However use of aluminium in the form of flakes causes the troubles of the mass transfer in the radial direction, it defined by the strongly marked anisotropy of the properties.

It should to be noted that use of aluminium powder in flakes is characterized by the increased danger because of the large open space, this fact results in difficulties for the support preparation.

In accordance with GOST 5494-95 the powders of aluminium in the form of flakes or "aluminium powders" consist of the particles of the flaky (scaled) form. They are manufactured by grinding of the primary aluminium of grade at least A5 in accordance with GOST 11069 or from the aluminium waste (the chemical composition of the waste is the same as aluminium of the grade A5). Particularly, the largest producer RUSAL manufactures the powder of five following grades: PAP-1, PAP-2, PAG-1, PAG-2, PAG-3. The scaled aluminium powders are used for manufacture of the "silvery" paints and in the defense industry.

As well as the powders of the "spherical" aluminium in particles of globular form are well known in the pyrotechnics, the ferrous metallurgy, the chemical industry, the welding engineering. The powders are produced by pulverization of molten aluminium in an inert gas heated to the melting temperature with simultaneous supplying of cold inert gas into the zone of atomization (see RU2081733).

Particularly, the largest producer RUSAL manufactures the powders of the "spherical" aluminium of grade ASD according to the standard 48-5-226-87. These powders are defined by less specific open surface and hence their use is less dangerous.

SUMMARY OF THE INVENTION

In accordance with the present invention, a support for catalyst of exothermic processes is provided. The support comprises the metallic aluminium in the form of mixture from the dispersed powders of flaky and spherical aluminium and a binder in the following ratio, weight %:
the metallic aluminium—25-95,
the binder—balance.

In one preferred embodiment of the invention the weight ratio of the powder of spherical aluminium is 20-50% by weight based on the total weight of the mixture of the powders of flaky and spherical aluminium.

In one preferred embodiment of the invention the binder contains boehmite, silicon oxide or graphite.

In one preferred embodiment of the invention the binder comprises a promoter selected from the group of oxides or mixed oxides of Mg, Ca, Zn, Ba, Al, Si, Zr, Ti, Cr, Ce and/or their mixtures, moreover the promoter content is no more than 50% by weight based on the weight of the binder.

In one preferred embodiment of the invention the support is pellets, cylinders, tablets, balls, obtained by extrusion, pelletization, tabletting, rounding or liquid molding.

A catalyst for the exothermic processes is provided. The catalyst comprises an active metal selected from the group of Co, Fe, Ni, Ru, Rh, Pt, Pd, Cu and/or mixtures thereof and a support, containing the metallic aluminium in the form of mixture from the dispersed powders of flaky and spherical aluminium and a binder, wherein the active metal content is 0.1-40% based on the total weight of the catalyst.

In one preferred embodiment of the invention the catalyst further comprises a promoter of the active metal selected from the elements of II-IV and/or VI-VIII groups of the Mendeleev's Periodic Table of the Elements in an amount of 0.1-5% based on the total weight of the catalyst.

The present catalyst is suitable for exothermic processes, particularly the Fischer-Tropsch process, methanol synthesis, hydrogenation, purification of exhaust gases.

DETAIL DESCRIPTION OF PREFERRED EMBODIMENTS

Numerous studies of the inventors surprisingly demonstrate that if the metallic aluminium in the form of mixture from the dispersed powders of flaky and spherical aluminium is used in the support for catalyst of exothermic processes then the local areas without anisotropy are formed in the catalyst. Evidently the reason of the fact is an ordering of the support structure, as well as it gives an option using the advantages of the metallic aluminium without shortages, i.e. along with high heat conductivity. The factors improve the heat removal from the reaction zone; the support acquires the enhanced isotropic properties that increase the heat and mass transfer inside the catalyst. It provides more intense chemical reaction and enhances the process productivity due to the load increase on the input reagents.

As well as it is possible to use the catalyst in pellets. The advantages of the pelletized catalyst and support are well known and consist of that the pelletized catalyst can form the fixed bed having low hydraulic resistance in the reactor. Such bed allows for effective supplying of the raw material to the active centers of the catalyst and removing the products. The reactors with the pelletized catalysts are simple, reliable and cheap; they do not require the special mixing devices and other complications that are essential for the reactors with the catalysts in the form of the dispersed particles or powders.

Therefore due to the acquired isotropy the present support and the catalyst enhance use of the catalytic surface of the pellets and provide more intense chemical reaction. The isotropy of the support and the catalyst resulting in mass transfer improvements inside the pellet is provided by the combined use of the dispersed powders of flaky and spherical aluminium. As well as the reduction of flaky aluminium content and its combination with the powder of spherical aluminium diminish dramatically their handling hazard and simplify the support preparation.

In accordance with the present invention, a support for catalyst of exothermic processes is provided. The support comprises the metallic aluminium in the form of mixture from the dispersed powders of flaky and spherical aluminium and a binder in the following ratio, weight %:
the metallic aluminium—25-95,
the binder—balance.

The content of the metallic aluminium less 25% by weight based on the total weight of the support does not provide the catalyst with the disclosed properties; the content more 95% is inadvisable because of the low activity of the catalyst prepared thereon.

The dispersed aluminium powders are powders with particle size no more than 100 μm.

In one preferred embodiment of the invention the weight ratio of the powder of spherical aluminium is 20-50% by weight based on the total weight of the mixture of the powders of flaky and spherical aluminium.

The reduction of the weight ratio of spherical aluminium in the support less 20% does not provide the acquiring of the isotropic properties by the support, the increase more 50% results in the mechanical strength reduction of the support and the catalyst prepared thereon.

In one preferred embodiment of the invention the binder comprises boehmite or silicon oxide or graphite.

In one preferred embodiment of the invention the binder comprises a promoter selected from the group of the oxides or mixed oxides of Mg, Ca, Zn, Ba, Al, Si, Zr, Ti, Cr, Ce and/or their mixtures, moreover the promoter content is no more than 50% by weight based on the weight of the binder.

The promoter content higher than 50% is not reasonable because it does not enhance the catalyst properties.

It is important that the support can be prepared in pellets and the support is cylinders, tablets, balls, obtained by extrusion, pelletization, tabletting, rounding or liquid molding.

A catalyst for exothermic processes is provided. The catalyst comprises an active metal selected from the group of Co, Fe, Ni, Ru, Rh, Pt, Pd, Cu and/or mixtures thereof and a support, containing the metallic aluminium in the form of mixture from the dispersed powders of flaky and spherical aluminium and a binder, wherein the active metal content is 0.1-40% based on the total weight of the catalyst. The active metal is introduced by impregnation with an aqueous or organic solution of a metal salt. The active metal content less 0.1% does not allow obtaining the catalyst with the disclosed properties, and the content more 40% is inadvisable because the catalyst cost became very high compared with the activity growth.

In one preferred embodiment of the invention the catalyst further comprises a promoter of the active metal selected from the elements of II-IV and/or VI-VIII groups of the Mendeleev's Periodic Table of the Elements in an amount of 0.1-5% based on the total weight of the catalyst.

The present support is prepared as follows:

The binder (e.g. boehmite), the dispersed powder of spherical aluminium and the dispersed powder of flaky aluminium is added to the mixture of nitric acid $HNO_3$ (64%), distilled water and triethylene glycol (TEG); stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst is prepared by impregnation of the support with an aqueous solution of cobalt nitrate hexahydrate $Co(NO_3)_2 \cdot 6H_2O$ to produce a 20-wt % cobalt. Then the pellets are dried in a water bath and calcinated in air flow at 400° C. during 3 hours, cooled in air flow to the room temperature. The catalyst is loaded into the fixed-bed reactor and activated in the hydrogen stream at 400° C. during 1 h.

The catalyst is tested in the Fischer-Tropsch process at 235° C., 2 MPa, with gas hour space velocity (GHSV) of syngas of 4000 l/h and a $H_2/CO$ volume ratio of 2.

Before carrying out the synthesis, a sample of the catalyst is activated by reduction in a stream of hydrogen containing gas (GHSV 1000-10000 l/h) at atmospheric pressure and a temperature in the range from 250 to 450° C. (preferably 350-450° C.) during a time period from 0.5 to 10 hours.

To further illustrate various embodiments of the present invention the following non-limiting examples are provided:

EXAMPLE 1

A sample of support (75% Al+25% binder) is prepared as follows.

2.5 g of boehmite, 1.5 g of the spherical aluminium powder of grade ASD-1 and 6 g of the flaky aluminium powder of grade PAP-2 were added to 0.45 ml $HNO_3$ (64%), 10 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 20% Co/support is prepared by impregnation of the support (75% Al+25% binder) with an aqueous solution of cobalt nitrate hexahydrate $Co(NO_3)_2 \cdot 6H_2O$ to produce 20-wt % Co; the pellets are dried in a water bath and calcinated in air flow at 400° C. during 3 hours, then cooled in air flow to the room temperature. The catalyst is loaded into the fixed-bed reactor and activated in the hydrogen stream at 400° C. during 1 h.

The catalyst tested in the Fischer-Tropsch process at 235° C., at 2 MPa, with gas hour space velocity of syngas 4000 l/h and a $H_2/CO$ volume ratio of 2 exhibits: CO conversion of 70%, $C_{5+}$ selectivity of 60% and productivity of 349 kg/m$^3$/h.

EXAMPLE 2

A sample of support (25% Al+75% binder) is prepared as follows.

7.5 g of the binder consisting of 3.75 g of boehmite and 3.75 g of MgO; 1.25 g of the spherical aluminium powder of grade ASD-1 and 1.25 g of the flaky aluminium powder of grade PAP-2 were added to 0.675 ml $HNO_3$ (64%), 12 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 30% Co-2.5% Al/support is prepared as follows:

The obtained support (25% Al+75% binder) is impregnated with an aqueous solution of aluminium nitrate to produce 2.5-wt % Al, dried in a water bath and calcinated in air flow at 400° C. during 3 hours. The material is impregnated with an aqueous solution of cobalt nitrate hexahydrate $Co(NO_3)_2 \cdot 6H_2O$ to produce 30-wt % Co; the pellets are dried in a water bath and calcinated in air flow at 400° C. during 1 hour, cooled in air flow to the room temperature. The catalyst is loaded into the fixed-bed reactor and activated in the hydrogen stream at 400° C. during 1 h.

The catalyst tested in the Fischer-Tropsch process at 235° C., at 2 MPa, with GHSV of syngas 4000 l/h and a $H_2/CO$ volume ratio of 2 exhibits: CO conversion of 64%, $C_{5+}$ selectivity of 62% and productivity of 330 kg/m$^3$/h.

EXAMPLE 3

A sample of support (50% Al+50% binder) is prepared as follows.

5 g of the binder consisting of 2.5 g of boehmite and 2.5 g of zeolite powder HY with module 20; 1.5 g of the spherical aluminium powder of grade ASD-6 and 3.5 g of the flaky aluminium powder of grade PAP-2 were added to 0.45 ml $HNO_3$ (64%), 10 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 20% Co/support is prepared as follows:

The obtained support (50% Al+50% binder) is impregnated with an aqueous solution of cobalt nitrate hexahydrate $Co(NO_3)_2 \cdot 6H_2O$ to produce 20-wt % Co; the pellets are dried in a water bath and calcinated in air flow at 250° C. during 1 hour, cooled in air flow to the room temperature. The catalyst is loaded into the fixed-bed reactor and activated in the hydrogen stream at 400° C. during 1 h.

The catalyst tested in the Fischer-Tropsch process at 235° C., at 2 MPa, with GHSV of syngas 4000 l/h and a $H_2/CO$ volume ratio of 2 exhibits: CO conversion of 70%, $C_{5+}$ selectivity of 68% and productivity of 396 kg/m³/h.

EXAMPLE 4

A sample of support (50% Al+50% binder) is prepared as follows.

5 g of the binder consisting of 3 g of boehmite and 2 g of silica gel; 1.5 g of the spherical aluminium powder of grade ASD-6 and 3.5 g of the flaky aluminium powder of grade PAP-1 were added to 0.54 ml $HNO_3$ (64%), 10 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 10% Co-5% Zr/support is prepared as follows:

The obtained support (50% Al+50% binder) is impregnated with an aqueous solution of zirconyl nitrate to produce 5-wt % Zr, dried in a water bath and calcinated in air flow at 400° C. during 3 hours. The material is impregnated with an aqueous solution of cobalt nitrate hexahydrate $Co(NO_3)_2 \cdot 6H_2O$ to produce 10-wt % Co; the pellets are dried in a water bath and calcinated in air flow at 250° C. during 1 hour, cooled in air flow to the room temperature. The catalyst is loaded into the fixed-bed reactor and activated in the hydrogen stream at 400° C. during 1 h.

The catalyst tested in the Fischer-Tropsch process at 235° C., at 2 MPa, with GHSV of syngas 4000 l/h and a $H_2/CO$ volume ratio of 2 exhibits: CO conversion of 65%, $C_{5+}$ selectivity of 61% and productivity of 330 kg/m³/h.

EXAMPLE 5

A sample of support (50% Al+50% binder) is prepared as, follows.

5 g of the binder consisting of 4 g of boehmite and 1 g of $TiO_2$; 1.5 g of the spherical aluminium powder of grade PAG-1 and 3.5 g of the flaky aluminium powder of grade PAP-1 were added to 0.72 ml $HNO_3$ (64%), 11 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 20% Fe-2% Mg/support is prepared as follows:

The obtained support (50% Al+50% binder) is impregnated with an aqueous solution of magnesium nitrate to produce 2-wt % Mg, dried in a water bath and calcinated in air flow at 400° C. during 1 hour. The material is impregnated with an aqueous solution of $Fe(NO_3)_3 \cdot 9H_2O$ to produce 20-wt % Fe; the pellets are dried in a water bath and calcinated in air flow at 250° C. during 1 hour, cooled in air flow to the room temperature. The catalyst is loaded into the fixed-bed reactor and activated in the hydrogen stream at 350° C. during 1 h.

The catalyst tested in the Fischer-Tropsch process at 240° C., at 2 MPa, with GHSV of syngas 4000 l/h and a $H_2/CO$ volume ratio of 2 exhibits: CO conversion of 63%, $C_{5+}$ selectivity of 60% and productivity of 314 kg/m³/h.

EXAMPLE 6

A sample of support (50% Al+50% binder) is prepared as follows.

5 g of the binder consisting of 2 g of boehmite and 2 g of $Al_2O_3$ and 1 g of CaO; 2 g of the spherical aluminium powder of grade ASP-0-63 and 3 g of the flaky aluminium powder of grade PAP-2 were added to 0.45 ml $HNO_3$ (64%), 10 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 15% Ru-1% Cr/support is prepared as follows:

The obtained support (50% Al+50% binder) is impregnated with an aqueous solution of chromium nitrate to produce 1-wt % Cr, dried in a water bath and calcinated in air flow at 400° C. during 1 hour. The material is impregnated with a solution of $RuCl_3$ in ethanol to produce 15-wt % Ru; the pellets are dried in a water bath and calcinated in air flow at 400° C. during 1 hour, cooled in air flow to the room temperature. The catalyst is loaded into the fixed-bed reactor and activated in the hydrogen stream at 400° C. during 1 h.

The catalyst tested in the Fischer-Tropsch process at 245° C., at 2 MPa, with GHSV of syngas 4000 l/h and a $H_2/CO$ volume ratio of 2 exhibits: CO conversion of 66%, $C_{5+}$ selectivity of 59% and productivity of 324 kg/m³/h.

EXAMPLE 7

A sample of support (40% Al+60% binder) is prepared as follows.

6 g of the binder consisting of 3 g of boehmite and 2 g of $SiO_2$ and 1 g of $ZrO_2$; 1 g of the spherical aluminium powder of grade ASP-0-63 and 3 g of the flaky aluminium powder of grade PAP-2 were added to 0.54 ml $HNO_3$ (64%), 10 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 20% Co-0.1% Re/support is prepared as follows:

The obtained support (40% Al+60% binder) is impregnated with an aqueous solution of ammonium perrhenate to produce 0.1-wt % Re, dried in a water bath and calcinated in air flow at 400° C. during 1 hour. The material is impregnated with an aqueous solution of cobalt nitrate hexahydrate $Co(NO_3)_2 \cdot 6H_2O$ to produce 20-wt % Co; the pellets are dried in a water bath and calcinated in air flow at 400° C. during 1 hour, cooled in air flow to the room temperature. The catalyst is loaded into the fixed-bed reactor and activated in the hydrogen stream at 400° C. during 1 h.

The catalyst tested in the Fischer-Tropsch process at 235° C., at 2 MPa, with GHSV of syngas 4000 l/h and a $H_2/CO$ volume ratio of 2 exhibits: CO conversion of 66%, $C_{5+}$ selectivity of 72% and productivity of 389 kg/m³/h.

EXAMPLE 8

A sample of support (60% Al+40% binder) is prepared as follows.

4 g of the binder consisting of 2 g of aerosil and 2 g of zeolite powder HMor with module 20; 1.2 g of the spherical aluminium powder of grade PAG-1 and 4.8 g of the flaky aluminium powder of grade PAP-2 were added to 1.5 ml $NH_4OH$ (30%), 9.5 ml of distilled water and 0.6 ml of triethylene glycol (TEG) and stirring was continued until a homogeneous mixture was obtained. Then the mixture was extruded through a die of diameter 2.5 mm. The extruded body were dried on air at 120° C. during 6 hours, calcinated in a drying oven on air at 450° C. during 5 hours. Then the extruded body were cooled to the room temperature and cut to 2.5×2.5 mm pellets.

The catalyst 20% Co-3% Fe/support is prepared as follows:

The obtained support (60% Al+40% binder) is impregnated with an aqueous solution of ferrous nitrate (III) to produce 3-wt % Fe, dried in a water bath and calcinated in air flow at 400° C. during 1 hours. The material is impregnated with an aqueous solution of cobalt nitrate hexahydrate $Co(NO_3)_2 \cdot 6H_2O$ to produce 20-wt % Co; the pellets are dried in a water bath and calcinated in air flow at 250° C. during 1 hour, cooled in air flow to the room temperature. The catalyst is loaded into the fixed-bed reactor and activated in the hydrogen stream at 400° C. during 1 h.

The catalyst tested in the Fischer-Tropsch process at 235° C., at 2 MPa, with GHSV of syngas 4000 l/h and a $H_2/CO$ volume ratio of 2 exhibits: CO conversion of 67%, $C_{5+}$ selectivity of 71% and productivity of 396 kg/m³/h.

EXAMPLE 9

A sample of support (80% Al+20% binder) is prepared as follows.

2 g of the binder consisting of 1 g of boehmite and 1 g of $Cr_2O_3$ powder, 1.6 g of the spherical aluminium powder of grade ASP-0-63 and 6.4 g of the flaky aluminium powder of grade PAP-2 were added to 0.2 ml $HNO_3$ (64%), 9 ml of distilled water and 0.6 ml of triethylene glycol (TEG) and stirring was continued until a homogeneous mixture was obtained. Then the mixture was extruded through a die of diameter 1.5 mm. The extruded body were dried on air at 120° C. during 6 hours, calcinated in a drying oven on air at 400° C. during 5 hours. Then the extruded body were cooled to the room temperature and cut to 1.5×3-5 mm pellets.

The catalyst 5% Ni/support is prepared as follows:

The obtained support (80% Al+20% binder) is impregnated with an aqueous solution of nickel nitrate to produce 5-wt % Ni; the pellets are dried in a water bath and calcinated in air flow at 400° C. during 1 hour, then cooled in air flow to the room temperature. The catalyst is loaded into the fixed-bed reactor and activated in the hydrogen stream at 400° C. during 1 h.

The catalyst tested in the benzene hydrogenation at 110° C., at 1 MPa, with benzene flow rate of 900 kg/dm³/h exhibits: benzene conversion of 98%, cyclohexane selectivity of 90% and productivity of 940 kg/dm³/h.

EXAMPLE 10

A sample of support (40% Al+60% binder) is prepared as follows.

6 g of the binder consisting of 3 g of boehmite and 2.5 g of ZnO and 0.5 g of BaO; 1 g of the spherical aluminium powder of grade ASP-0-63 and 3 g of the flaky aluminium powder of grade PAP-2 were added to 0.5 ml $HNO_3$ (64%), 15 ml of distilled water and 0.6 ml of triethylene glycol (TEG) and stirring was continued until a homogeneous mixture was obtained. Then the spherical pellets of 3 mm diameter were obtained from the mixture by the liquid molding. The pellets were dried on air at 120° C. during 3 hours, calcinated in a drying oven on air at 400° C. during 5 hours and cooled to the room temperature.

The catalyst 40% Cu/support is prepared as follows:

The obtained support (40% Al+60% binder) is impregnated with an aqueous solution of copper nitrate to produce 40-wt % Cu, dried in a water bath and calcinated in air flow at 400° C. during 1 hour and cooled in air flow to the room temperature. The catalyst is loaded into the fixed-bed reactor and activated in the hydrogen stream at 220° C. during 6 h.

The catalyst tested in the methanol synthesis from CO and $H_2$ at 180° C., at 5 MPa, with GHSV of syngas 10000 l/h and a $H_2/CO$ volume ratio of 2 exhibits: CO conversion of 77%, methanol selectivity of 81% and productivity of 2.96 kg/m³/h.

EXAMPLE 11

A sample of support (80% Al+20% binder) is prepared as follows.

2 g of the binder consisting of 1 g of graphite and 1 g of $CeO_2$ powder; 2 g of the spherical aluminium powder of grade PAG-1 and 6 g of the flaky aluminium powder of grade PAP-2 were stirred for obtaining of the homogeneous mixture. The cylinders with diameter and height of 5 mm were prepared from the mixture by pressing tabletization to 2-mm size pellets. The pellets were calcinated in a drying oven on inert atmosphere at 400° C. during 5 hours. Then the pellets were cooled to the room temperature.

The catalyst 0.1% Pt/support is prepared as follows:

The obtained support (80% Al+20% binder) is impregnated with an aqueous solution of chloroplatinic acid to produce 0.1-wt % Pt; the pellets are dried in a water bath and calcinated in nitrogen flow at 400° C. during 1 hour, then cooled in air flow to the room temperature. The catalyst is loaded into the fixed-bed reactor and activated in the hydrogen stream at 250° C. during 3 h.

The catalyst tested in the process of purification of the gas mixture imitating the composition of exhaust gases of diesel engine at 180° C., at 0.1 MPa, with GHSV of 10000 l/h exhibits: purification efficiency from CO of 99%, from $NO_x$ of 98%.

EXAMPLE 12

A sample of support (95% Al+5% binder) is prepared as follows.

0.5 g of the binder consisting of graphite; 1.9 g of the spherical aluminium powder of grade ASD-1 and 8.1 g of the flaky aluminium powder of grade PAP-1 were stirred for obtaining of the homogeneous mixture. The cylinders with diameter and height of 3 mm were prepared from the mixture by pressing tabletization to 2-mm size pellets. The pellets were calcinated in a drying oven on inert atmosphere at 400° C. during 5 hours. Then the pellets were cooled to the room temperature.

The catalyst 0.2% Pd/support is prepared as follows:

The obtained support (95% Al+5% binder) is impregnated with an aqueous solution of palladium chloride to produce 0.2-wt % Pd; the pellets are dried in a water bath and calcinated in nitrogen flow at 400° C. during 1 hour, then cooled in air flow to the room temperature. The catalyst is loaded into the fixed-bed reactor and activated in the hydrogen stream at 250° C. during 3 h.

The catalyst tested in the process of purification of the gas mixture imitating the composition of exhaust gases of diesel engine at 180° C., at 0.1 MPa, with GHSV of 10000 l/h exhibits: purification efficiency from CO and $NO_x$ of 99%.

The examples demonstrate that the claimed support and catalyst for the exothermic processes have the isotropic properties that improve the mass transfer inside the catalyst pellet. It provides more intense chemical reaction and enhances the process productivity due to the GHSV increase on the input reagents.

Use of the claimed support and the catalyst prepared thereon in the exothermic processes, particularly the Fischer-Tropsch process, methanol synthesis, hydrogenation, purification of exhaust gases results in high activity and productivity of the catalyst in the fixed-bed reactor at increased load on raw material.

The invention claimed is:

1. A support for catalyzing an exothermic process comprising a metallic aluminium and a binder, wherein the metallic aluminium is in the form of a mixture of dispersed powders of flaky and spherical aluminium, wherein the amount of the metallic aluminium is 25-95% by weight % and the balance by weight % is binder;

and wherein the support has an ordered structured determined by the flaky and spherical aluminum such that, when the support is used to support a catalyst of an exothermic process, local areas without anisotropy are formed in the catalyst.

2. The support according claim 1, wherein the amount of the powder of spherical aluminium is 20-50% by weight based on the total weight of the mixture of the powders of flaky and spherical aluminium.

3. The support according claim 1, wherein boehmite, silicon oxide or graphite is used as the binder.

4. The support according claim 3, wherein the binder comprises a promoter selected from the group consisting of oxides of Mg, Ca, Zn, Ba, Al, Si, Zr, Ti, Cr, Ce and mixtures thereof, wherein the promoter content is no more than 50% by weight based on the weight of the binder.

5. The support according claim 1, wherein the support is in the form of a pellet.

6. A catalyst for exothermic processes comprising an active metal selected from the group consisting of Co, Fe, Ni, Ru, Rh, Pt, Pd, Cu and mixtures thereof and the support according claim 1, wherein the active metal content is 0.1-40% based on the total weight of the catalyst.

7. The catalyst according claim 6 further comprising a promoter of the active metal selected from the group consisting of an element of II-IV and/or VI-VIII groups of the Mendeleev's Periodic Table of the Elements in an amount of 0.1-5% based on the total weight of the catalyst.

8. The support according to claim 1, wherein the support is in a form selected from the group consisting of a cylinder, a tablet and a ball.

9. A method of manufacturing the support according to claim 1 comprising a step of extruding, pelleting, tabletting, rounding or liquid molding said support.

10. A method of catalyzing an exothermic process comprising providing the catalyst of claim 6 to said exothermic process.

* * * * *